United States Patent
VanderPol et al.

(10) Patent No.: US 7,677,846 B2
(45) Date of Patent: Mar. 16, 2010

(54) METHOD AND APPARATUS FOR WELD PROFILING

(75) Inventors: Jerald W. VanderPol, Shingle Springs, CA (US); Lane L. Larson, Folsom, CA (US)

(73) Assignee: TRI Tool Inc., Rancho Cordova, CA (US)

( * ) Notice: Subject to any disclaimer, the term of this patent is extended or adjusted under 35 U.S.C. 154(b) by 750 days.

(21) Appl. No.: 11/588,358

(22) Filed: Oct. 27, 2006

(65) Prior Publication Data

US 2007/0102488 A1 May 10, 2007

Related U.S. Application Data

(60) Provisional application No. 60/731,474, filed on Oct. 31, 2005.

(51) Int. Cl.
*B23C 1/20* (2006.01)
*B23C 3/12* (2006.01)
*B23Q 9/02* (2006.01)

(52) U.S. Cl. .................. 409/132; 409/179; 409/140; 228/160; 228/13

(58) Field of Classification Search .......... 409/132, 409/131, 179, 178, 139–140, 138, 293, 299, 409/296, 297, 298, 303; 29/33 A; 228/13, 228/19, 125, 160, 159

See application file for complete search history.

(56) References Cited

U.S. PATENT DOCUMENTS

| 1,778,973 | A | | 1/1930 | Frickey et al. | |
|---|---|---|---|---|---|
| 1,749,133 | A | | 3/1930 | Frickey et al. | |
| 2,625,860 | A | * | 1/1953 | Plester | 409/181 |
| 3,456,555 | A | * | 7/1969 | Dunlap | 409/179 |
| 4,297,061 | A | * | 10/1981 | Wolfe et al. | 409/179 |
| 4,438,600 | A | | 3/1984 | Berbakov | |
| 4,543,022 | A | * | 9/1985 | Bonner | 409/298 |
| 4,600,180 | A | | 7/1986 | Abbey, III | |
| 4,729,502 | A | * | 3/1988 | Fukukawa et al. | 228/13 |
| 4,976,176 | A | | 12/1990 | Vanderpol et al. | |
| 5,189,933 | A | | 3/1993 | Ricci | |
| 5,192,013 | A | | 3/1993 | Abbey, III et al. | |

(Continued)

FOREIGN PATENT DOCUMENTS

DE 3337056 A1 * 10/1985

(Continued)

*Primary Examiner*—Erica E Cadugan
(74) *Attorney, Agent, or Firm*—Bacon & Thomas, PLLC

(57) ABSTRACT

A method for removing a weld crown from a weld joint between first and second work pieces includes steps of positioning a rotary milling tool proximate to the joint and at an offset angle to set a cutting arc relative to the joint. The milling tool is positioned so the cutting arc intersects the weld crown, weld toes, and parent metal on each side of the weld joint. As the milling tool traverses the joint to cut away the weld crown, the milling tool may tilt from side to side to compensate for misalignment between the work pieces along the weld joint. An apparatus for weld crown removal holds a milling tool at an offset angle, and provides a tracking mechanism to permit the milling tool to track misalignment between the work pieces, maintaining the cutting arc in intersection with the weld toes and parent metal along the weld joint.

6 Claims, 10 Drawing Sheets

U.S. PATENT DOCUMENTS

| | | |
|---|---|---|
| 5,456,405 A | 10/1995 | Stagg |
| 5,662,145 A | 9/1997 | Stagg |
| 5,718,545 A | 2/1998 | Husted |
| 6,627,840 B2 | 9/2003 | Raley |
| 6,966,731 B2 * | 11/2005 | VanderPol et al. .......... 409/179 |
| 7,171,735 B2 * | 2/2007 | Okafuji et al. .............. 29/33 A |
| 2002/0125301 A1 | 9/2002 | Raley |

FOREIGN PATENT DOCUMENTS

| | | | |
|---|---|---|---|
| JP | 52-014983 A | * | 2/1977 |
| JP | 6-39431 | | 2/1994 |
| SU | 716781 A | * | 2/1980 |

* cited by examiner

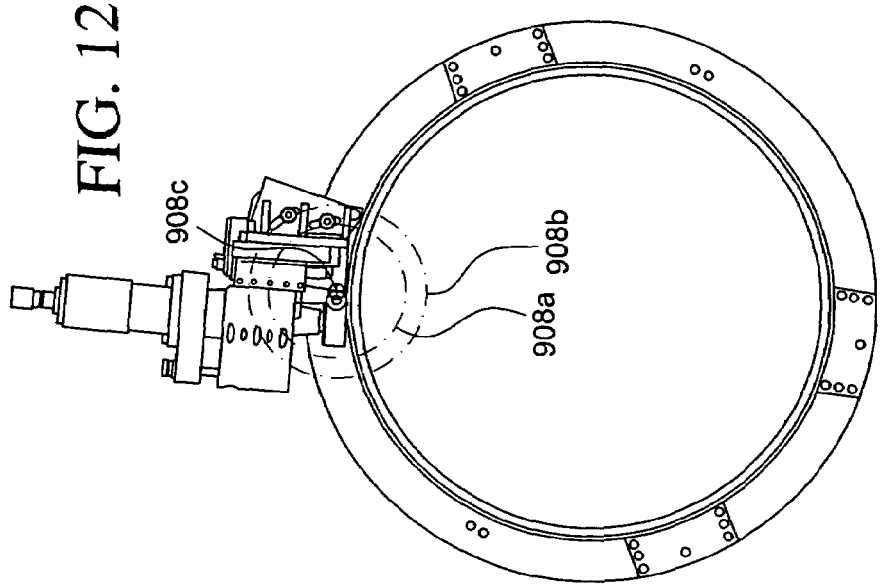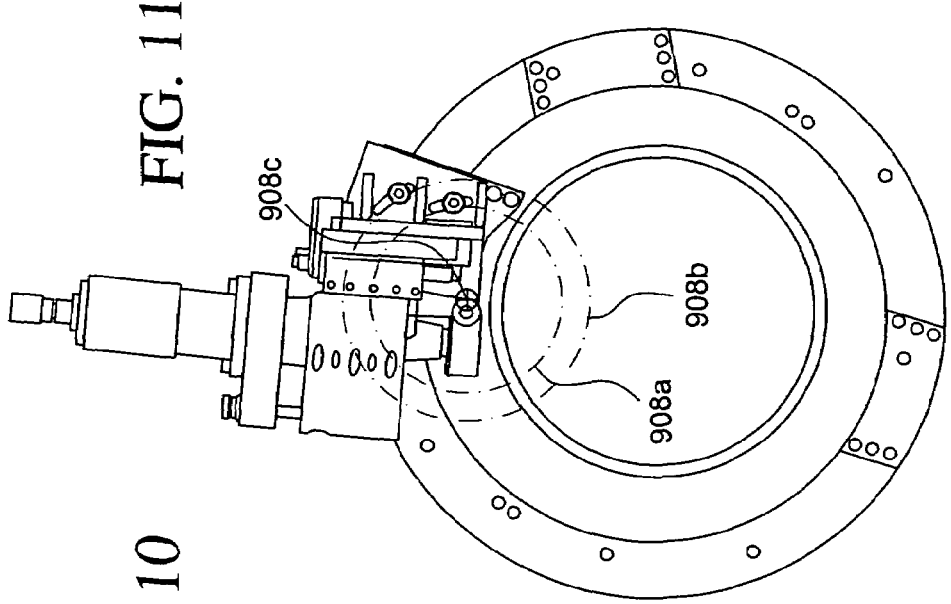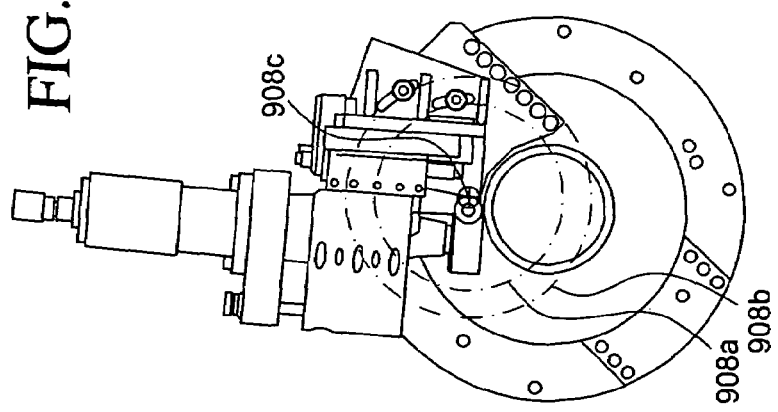

METHOD AND APPARATUS FOR WELD PROFILING

This application claims the benefit of priority of U.S. provisional application No. 60/731,474 filed on Oct. 31, 2005.

FIELD OF THE INVENTION

The present invention relates to the removal of a weld crown from a weld joint, and more particularly to a method and apparatus for the removal of a weld crown and weld toes from a weld joint to leave a contoured profile extending across the weld joint.

BACKGROUND

It is well known in the art to join adjacent metallic work pieces by welding the adjacent work pieces together along a weld seam. For example, pipe lines or pipe systems are fabricated by welding the ends of lengths of pipe together. Typically, the ends of the pipe lengths are beveled, or otherwise prepared ("prepped"), brought into contact or close proximity with each other, and welded together by running a weld bead around the prepped end portions. The finished weld bead generally has a crown portion or profile that extends outward from the peripheral surfaces of the ends of the pipes. It is often desirable, and in some cases necessary, to remove this weld crown so that the welded joint is finished to a smooth outer surface.

Various tools have been employed for the removal of a weld crown from a welded work piece or product. A weld crown is often removed from a weld seam by grinding, typically performed manually using a grinding tool. In processes of pipe fabrication, weld removal may be performed by a specialized tool, such as a portable lathe.

A portable lathe typically employed in pipe fabrication comprises a stationary "clamshell" power unit adapted for fitting about a pipe, the portable lathe having a rotatable cutting ring and a tool holder to attach a cutting tool to the cutting ring. The portable lathe is attached about one of the pipes adjacent to the weld joint, and the cutting tool is rotated about the pipe to remove the weld crown. Generally, the cutting tool is a single point cutting tool that cuts the weld crown in a narrow circumferential path around the pipe, the cutting tool circling about the pipe axis while it is advanced axially to remove the weld crown.

While a portable lathe is effective in removing a weld crown, the portable lathe may create stress risers that run circumferentially around the pipe in the cutting direction of the cutting tool. While the smoothed surface of the weld joint, due to the removal of the weld crown, generally results in a weld joint of greater strength or fatigue life than a weld joint with the weld crown left intact, the circumferential stress risers are considered to limit the strength or fatigue life of the weld joint and limit optimal strength or fatigue life from being reached in such a finished weld joint.

Other techniques have been used, in other environments, for removing a weld bead. For example, Japanese patent application disclosure Hei 6-39431 published Feb. 15, 1994 describes a method of manufacturing spiral steel pipe wherein, during the course of manufacturing the spiral steel pipe, a weld bead crown is cut away using a milling cutter.

It has been discovered that the fatigue life of a welded joint between pipe sections is significantly increased if the weld crown is removed along with a small amount of the parent metal along each side of the weld joint.

In an evaluation of a weld test coupon, using 32 inch diameter, 70-90,000 PSI tensile strength pipe, the grinding of the weld crown to remove the weld crown along with a small amount of the parent metal along each side of the weld joint, followed by polishing the surface of the weld joint, resulted in a three to four times improvement in the fatigue life of the weld joint by comparison to a weld test coupon on which the weld crown was not removed.

Thus, the formation of a contoured, profiled surface along the weld joint (a weld profile) that includes the removal of a small amount of the parent metal along each side of the weld joint, rather than simply removing the weld crown, is desirable to achieve an increase in the quality of the weld joint, and in particular to improve the fatigue life of the weld joint.

However, a manual process of grinding the weld crown, along with subsequent polishing, is tedious, time consuming, and costly. Moreover, such a manual process may lack precision, resulting in non-uniformity of a completed weld profile, characterized by insufficient or excessive removal of material.

An insufficient removal of material may fail to produce the desired weld joint quality, by inadequately extending the weld profile contour into the parent metal alongside the weld joint. An excessive removal of material may result in damage to the work product, by reducing the thickness of the pipe wall below a critical or minimum value. Also, heat generated by the grinder may itself contribute to strength degradation of the work product, based on metallurgical considerations.

A further difficulty in the task of creating a finished weld profile is introduced by any misalignment between adjoining work pieces, including a misalignment caused by dissimilar, ovoid or out-of-round pipe segments.

SUMMARY

The present invention relates to the removal of a weld crown from a weld joint, and more particularly to methods, apparatuses, and variations thereof for the removal of a weld crown and weld toes from a weld joint to leave a contoured profile extending across the weld joint to improve the fatigue life of the weld joint.

According to one preferred method, a method for removal of a weld crown employs a milling tool having a circular milling head such as a fly cutter. The milling tool is positioned with the milling head proximate to a weld joint between two adjacent work pieces, such as adjacent sections of pipe. The milling tool is moved in a direction of travel along the weld joint, as the milling head cuts away the weld crown.

The preferred milling tool is angled, or tilted, slightly in a plane defined by the direction of travel and a rotational axis of the milling head, such that a perimeter circular edge of the milling head defines a cutting arc relative to the weld crown and work pieces. Increasing the amount of tilt of the milling tool increases the depth, and decreases the radius, of the cutting arc.

The milling tool is set to a depth of cut such that the cutting arc of the milling head intersects the weld metal and adjacent weld toes (or the junction of the weld face and the parent metal), including a small amount of the parent metal along each side of the weld joint.

Cutting elements of the milling head cut the weld crown, and form a contoured weld profile, in a path generally transverse to the weld bead. Thus, any stress risers created by the removal of the weld bead run transverse to, and not lengthwise or circumferential with, the weld bead. Moreover, use of positive entrance angle and sharp carbide cutting elements leaves a smooth, high polished finish, reducing or eliminating the presence of transverse stress risers. The elimination of lengthwise or circumferential stress risers, and the reduction of transverse stress risers, with removal of weld toe areas of the base metal, contributes to a significant improvement in the strength of the finished weld in comparison to known, conventional techniques for weld crown removal.

As the preferred milling tool is moved along the weld joint, the milling tool may be tilted, or pivoted, in a plane generally transverse to the direction of travel according to variations in alignment between the first and second work pieces such that the cutting arc is maintained in intersection with said first and second work piece toe areas, so that the cutting arc continues to remove both the weld crown and a small amount of the parent metal along the toe areas on each side of the weld joint.

According to one embodiment of an apparatus for removal of a weld crown, an apparatus for removing a weld crown from a welded joint between first and second work pieces employs a tool carrier arranged to be mounted onto a work piece, the tool carrier having a movable member adapted for carrying a tool along said work piece in a direction of travel. A milling tool is mounted on the movable member, the milling tool having a milling cutter rotatable about a rotational axis. The milling tool is positioned with the rotational axis being generally coincident with a line normal to a proximal surface of said work piece, but tilted in a first plane defined by the rotational axis and the direction of travel by an offset angle so that a cutting radius of the milling cutter is defined by the offset angle and a diameter of the milling cutter.

Tracking wheels engage the work pieces on either side of the weld joint and enable the depth of cut to be set relative to the workpiece surfaces adjacent to the weld. The tracking wheels also maintain the milling cutter in cutting engagement with the weld crown and in intersection with the adjacent workpiece weld toe areas.

These and other features, aspects, and advantages of the present invention will become better understood with regard to the following description, appended claims, and accompanying drawings.

BRIEF DESCRIPTION OF THE DRAWINGS

FIG. 10 is a side view of the apparatus for weld profiling of FIG. 9 configured for profiling a weld in a pipe of a first diameter.

FIG. 11 is a side view of the apparatus for weld profiling of FIG. 9 configured for profiling a weld in a pipe of a second diameter.

FIG. 12 is a side view of the apparatus for weld profiling of FIG. 9 configured for profiling a weld in a pipe of a third diameter.

DETAILED DESCRIPTION OF VARIOUS EMBODIMENTS

Figure 1:
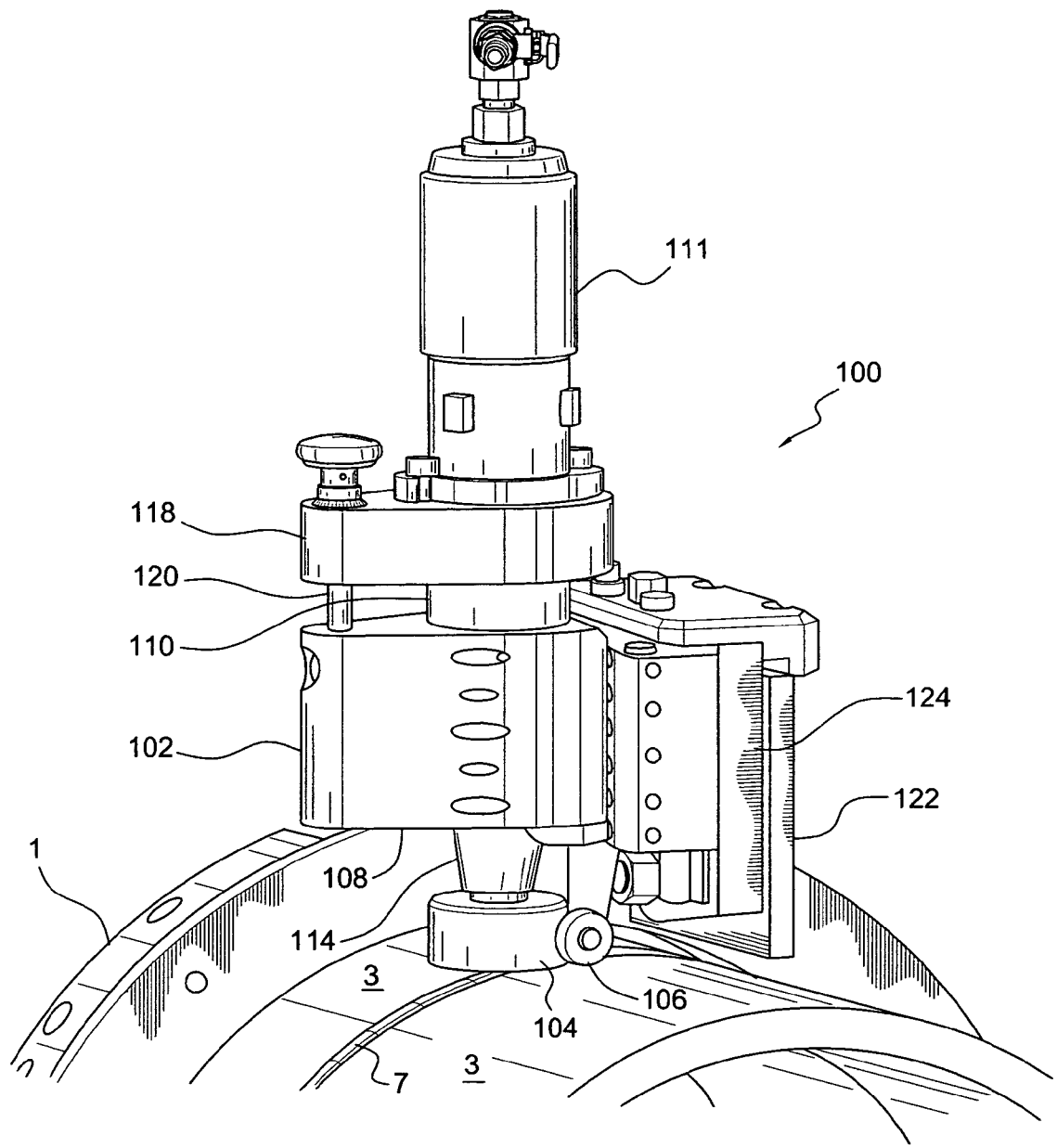
FIG. 1 is an environmental perspective view of an apparatus for weld profiling, shown positioned for profiling a welded pipe joint.

Referring to FIG. 1, a preferred apparatus for weld profiling is shown configured for performing weld profiling according to a method disclosed herein. In the embodiment of the weld profiling apparatus shown, a milling tool 102 is carried by a rotational drive mechanism 1 along a circumferential path about a pipe, generally following a weld joint 5 between pipe sections.

According to the method, the milling tool 102 is positioned with a milling cutter or milling head 104 (shown schematically in the figures) proximate to a weld joint 5 between two adjacent work pieces 3. The milling head 104 is rotatable about a rotational axis 200. The milling tool 102 is positioned so that the rotational axis 200 is generally normal to the surface of at least one of the work pieces 3, but slightly tilted as discussed in greater detail below. The milling tool 102 is positioned for movement along the weld joint 5 for the removal of a bead or weld crown 7 from the weld joint 5. In the illustration of FIG. 1, the work pieces 3 are pipe sections in a pipe line or a pipe structure. It can be recognized, of course, that the method for weld profiling is applicable to flat or irregularly curved surfaces or work pieces as well as to round or cylindrical work pieces 3 such as the pipe sections illustrated.

The milling tool 102 is moved in a direction of travel along the weld joint 5, as the milling head 104 cuts away the weld crown 7. The milling head 104 is a circular milling or cutting tool, such as a fly cutter or hog mill, having at least one cutting member defining a circular cutting path. Use of positive entrance angle, sharp carbide cutting members allows the cutting tool to leave a highly polished, smooth finish, eliminating the need to further polish the surface of the weld joint after performing the weld profiling. Additionally, such cutting members reduce the heating of the weld bead 13 and work pieces 3 during cutting as compared, for example, with grinding.

The size and configuration of the milling head (and particularly the diameter of the circular cutting path) may be selected to span the width of the weld joint 5 and to intersect weld toes 9 and parent metal 11 along each side of the weld joint 5, so that a weld profile may be cut by a single pass of the milling tool 102 along the weld joint 5.

Figure 2A:
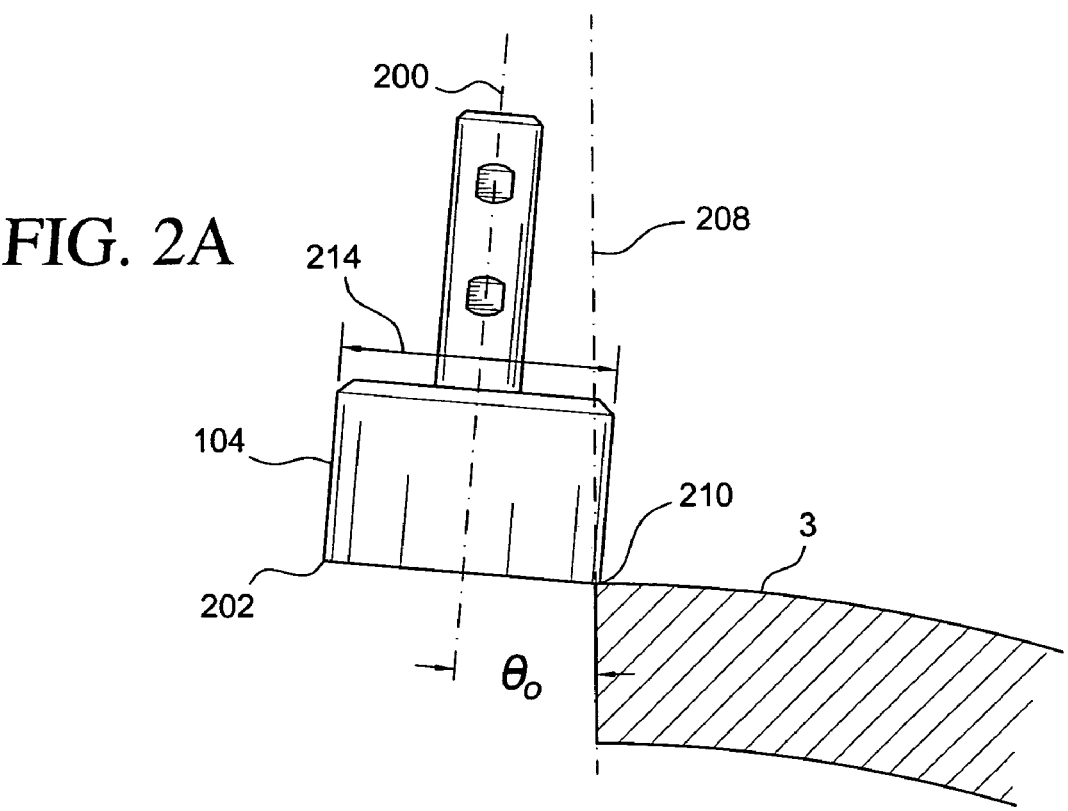
FIGS. 2A and 2B are a diagrammatic side and front view, respectively, of a milling head usable in the apparatus of FIG. 1, positioned for profiling a welded pipe joint weld bead wherein the milling head is angled to define a cutting arc relative to the welded pipe joint.
Figure 2B:
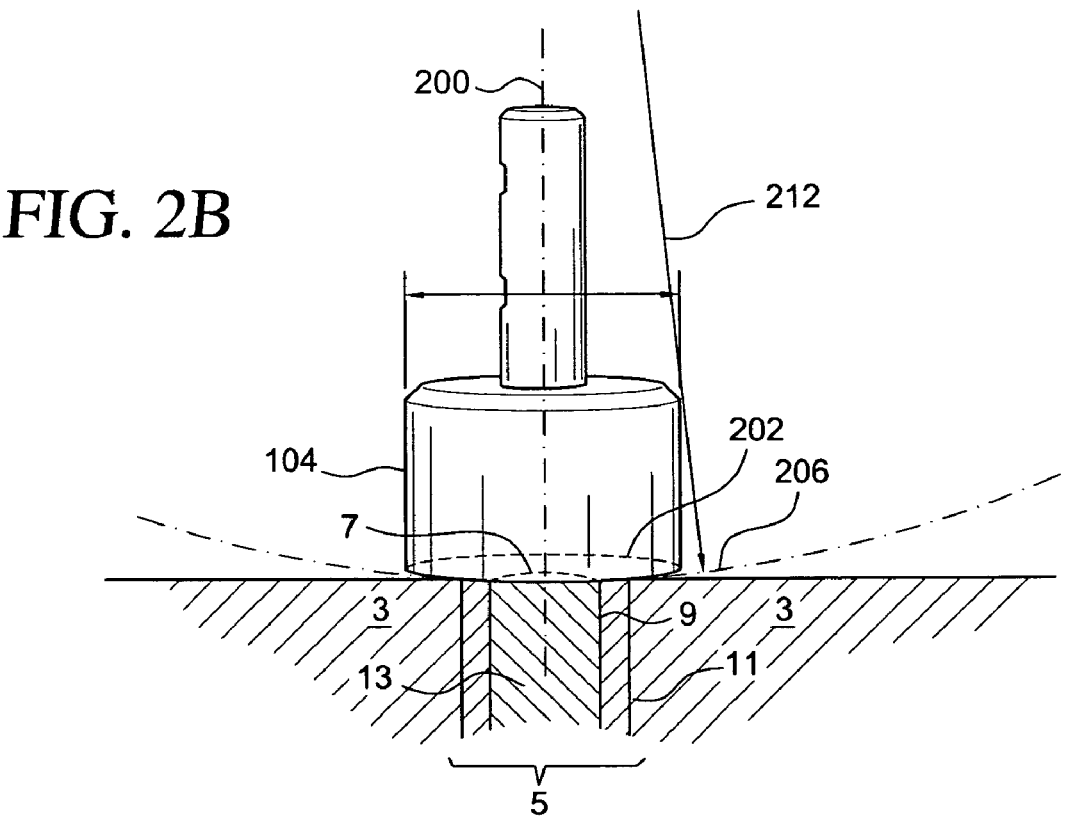

Referring now to FIGS. 2A and 2B, the milling head 104 is angled, or tilted, slightly (by an offset or tilt angle $\theta_o$) by orienting or tilting the rotational axis 200 of the milling tool 202 forward relative to the cutter feed direction in a plane defined by the direction of feed motion or travel and the rotational axis 200 to set a cutting arc of the milling head relative to the joint, such that a perimeter circular edge 202 of the milling head 104 defines a cutting arc 206 or profile relative to the weld crown 7 and work pieces 3.

It can be seen, with reference to the pipe application illustrated in FIGS. 2A and 2B, that the cutting arc 206 is essentially an orthographic projection of the circular cutting edge of the milling head 104 onto a transverse axial plane 208 intersecting the pipe at the leading edge 210 of the milling head 104. As a result, increasing the amount of the offset angle $\theta_o$ of the milling tool 102 decreases the radius, and increases the depth, of the cutting arc 206. In the example of FIGS. 2A and 2B, a milling head 104 having a diameter 214 of 2½ inches (6.37 centimeters), has an offset angle $\theta_o$ of approximately 5 degrees, resulting in a cutting arc 206 having a radius of approximately 24 inches.

Figure 3A:
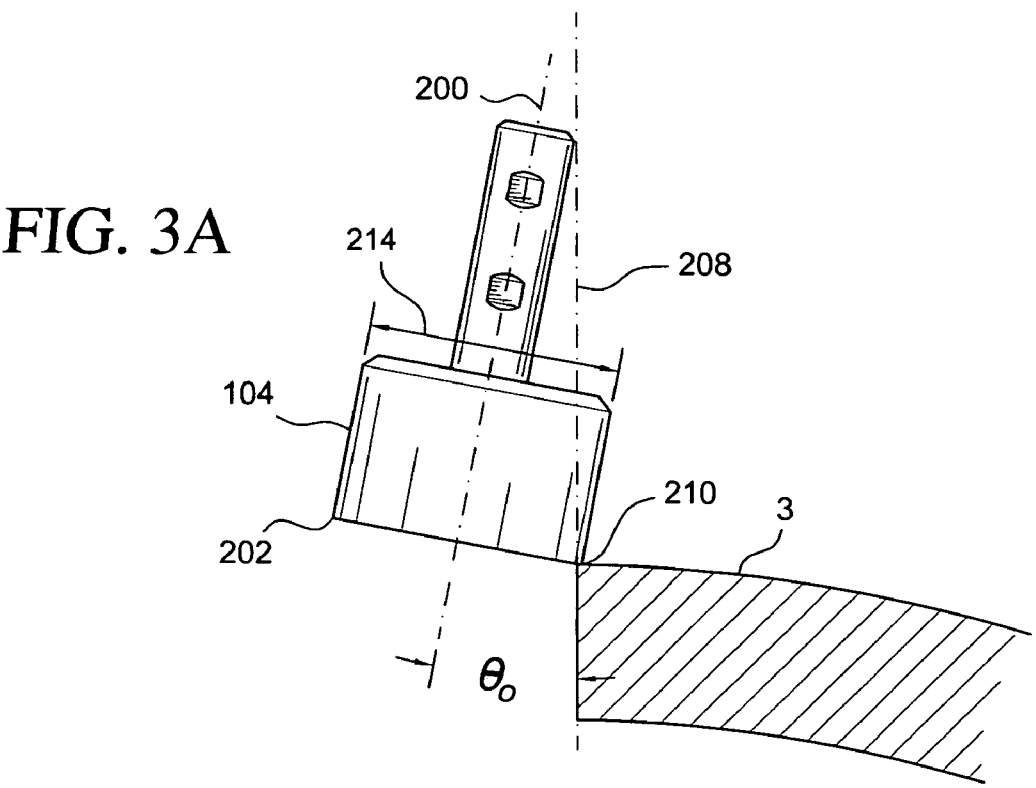
FIGS. 3A and 3B are diagrammatic side and front views, respectively, of a milling head positioned for profiling a pipe joint weld bead, wherein the milling head is angled to define a deeper cutting arc than shown in FIGS. 2A and 2B.
Figure 3B:
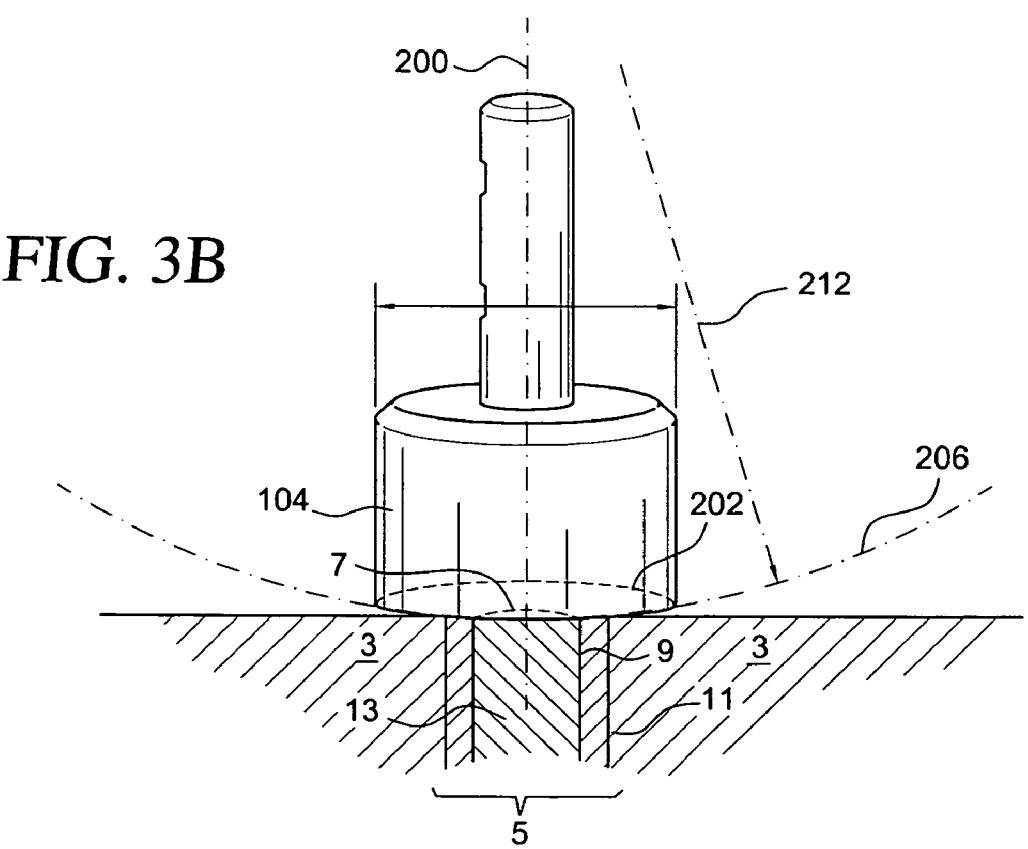

Referring to FIGS. 3A and 3B, the milling head 104 is shown at a greater offset angle $\theta_o$, illustrating the effect on the depth and radius of the cutting arc 206. An offset angle $\theta_o$ of approximately 10 degrees, with the milling head 104 having a diameter 214 of 2½ inches (6.37 centimeters), results in a cutting arc 206 having a radius of approximately 14 inches. It can be recognized that a greater offset angle $\theta_o$ will result in a deeper cutting arc 206 having a smaller radius, while a smaller offset angle $\theta_o$ will result in a shallower cutting arc 206 having a greater radius.

It can be further recognized that, with the milling head 104 generally centered over the weld crown 7, cutting elements of the milling head 104 cut the weld crown 7 along a path extending generally transverse to the weld joint 5.

The milling tool 102 is set to a cutting depth such that the cutting arc 206 of the milling head 104 intersects and removes weld toe areas 9, including parent metal 11, on both sides of the weld bead 13.

With the milling tool 102 positioned to provide the desired cutting depth and profile, the milling tool 102 is moved along the weld joint 5 to remove the weld crown 7.

As the milling tool 102 is moved along the weld joint 5, the rotational axis 200 is adjusted according to variations in alignment or wall thickness between the first and second work pieces so that the cutting arc 206 is maintained in intersection with the first and second work pieces. The rotational axis 200 is adjusted, by angling or tilting the milling tool 102 from side to side of the weld joint 5, generally in a plane defined by the rotational axis and a line transverse to the welded joint. This adjustment causes the cutting arc 206 to remain oriented in intersection with the weld toes 9, including parent metal 11, adjacent to each side of the weld bead 13 irrespective of slight axial misalignments between the outer circumferences of the workpieces 3.

The result is a contoured weld profile that is determined by the size (diameter) of the milling head 104, the offset angle $\theta_o$ of the milling tool 102 (and therefore the milling head 104), and the amount of offset between work pieces 3. Each variable affects the size and diameter of the cutting arc 206.

Figure 2C:
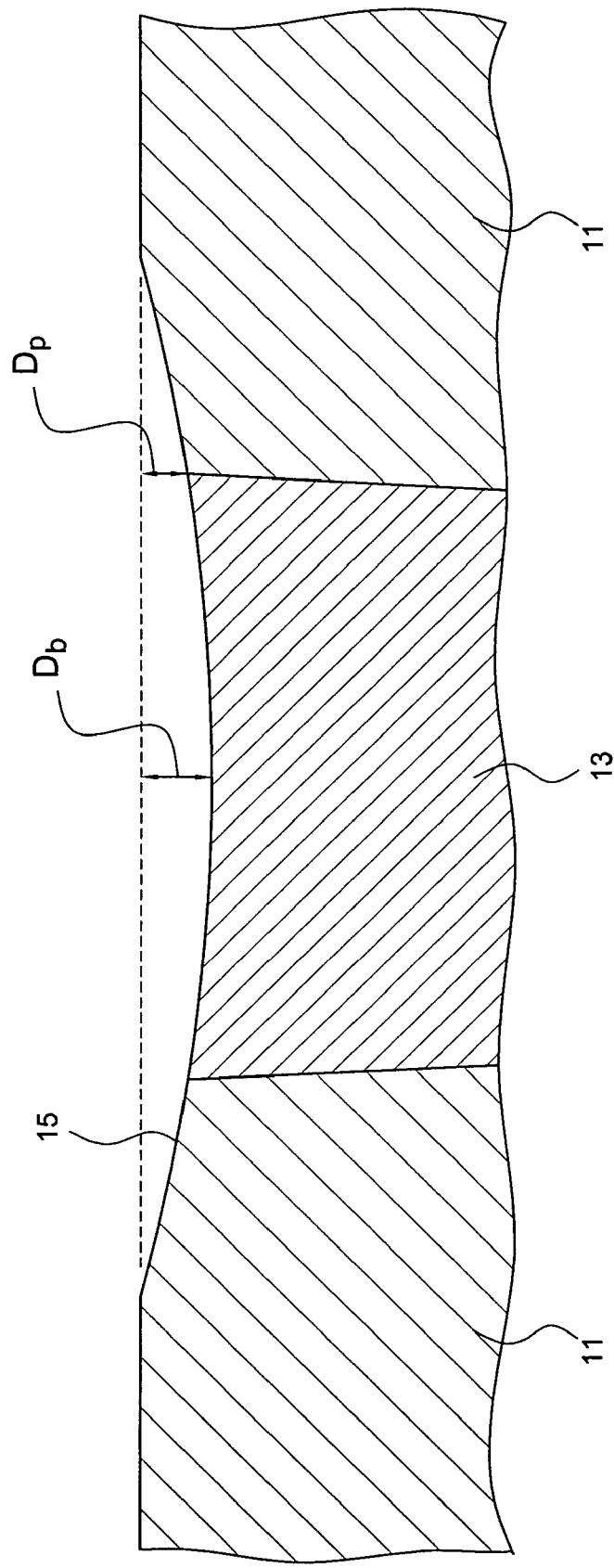
FIG. 2C is a partial section view of joined pipe segments showing a weld profile detail formed at the welded pipe joint.

Referring to FIG. 2C, an exemplary weld profile 15 is illustrated (not to scale). The weld profile 15 is characterized by a width W such that the weld profile 15 overlaps the weld bead 13 on each side of the weld bead 13, a maximum depth $D_b$ within the weld bead 13, and a depth $D_p$ at the junction of the weld bead 13 and the parent metal 11.

It can be recognized that these dimensions will vary according to the cutting arc 206 as determined by the offset angle $\theta_o$, the diameter of the milling head 104, and a depth adjustment or setting of the milling tool 102. Also, the weld profile 15 may vary as the milling tool 102 pivots from side to side of the weld joint 5 to track and compensate for any misalignment between the work pieces, resulting in an asymmetric weld profile 15.

According to an exemplary weld profile 15 for a ¾ inch (1.91 centimeter) weld bead 13 in a thirty-two (32) inch (81.28 centimeter) pipe having a wall thickness of 1½ inches (3.81 centimeters), the weld profile 15 extends into the parent metal 11 approximately a quarter to three eighths (¼-⅜) of an inch (0.64 to 0.95 centimeters) on each side of the weld bead 13, and has a depth of 0.03"-0.05" (0.08 to 0.13 centimeters) at the center of the weld bead 13, and a depth of 0.02"-0.04" (0.05 to 0.10 centimeters) in the parent metal 11. It can be understood that these dimensions are exemplary only, and that the dimensions will vary according to pipe dimensions, and minimum or maximum wall thickness specifications for various different pipes and applications.

Figure 4:
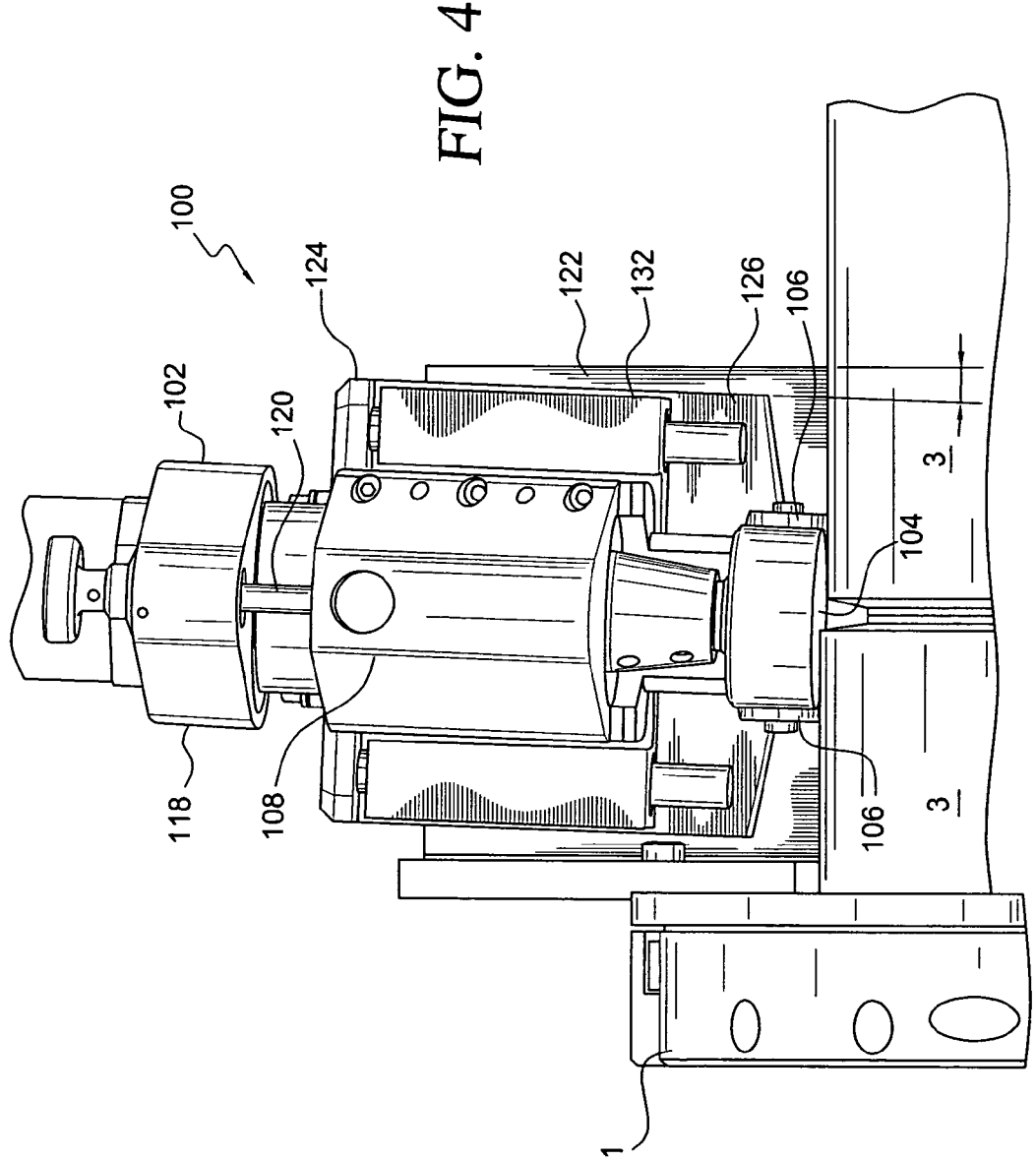
FIG. 4 is a front view of an apparatus for weld profiling, shown positioned for profiling a welded pipe joint.
Figure 5:
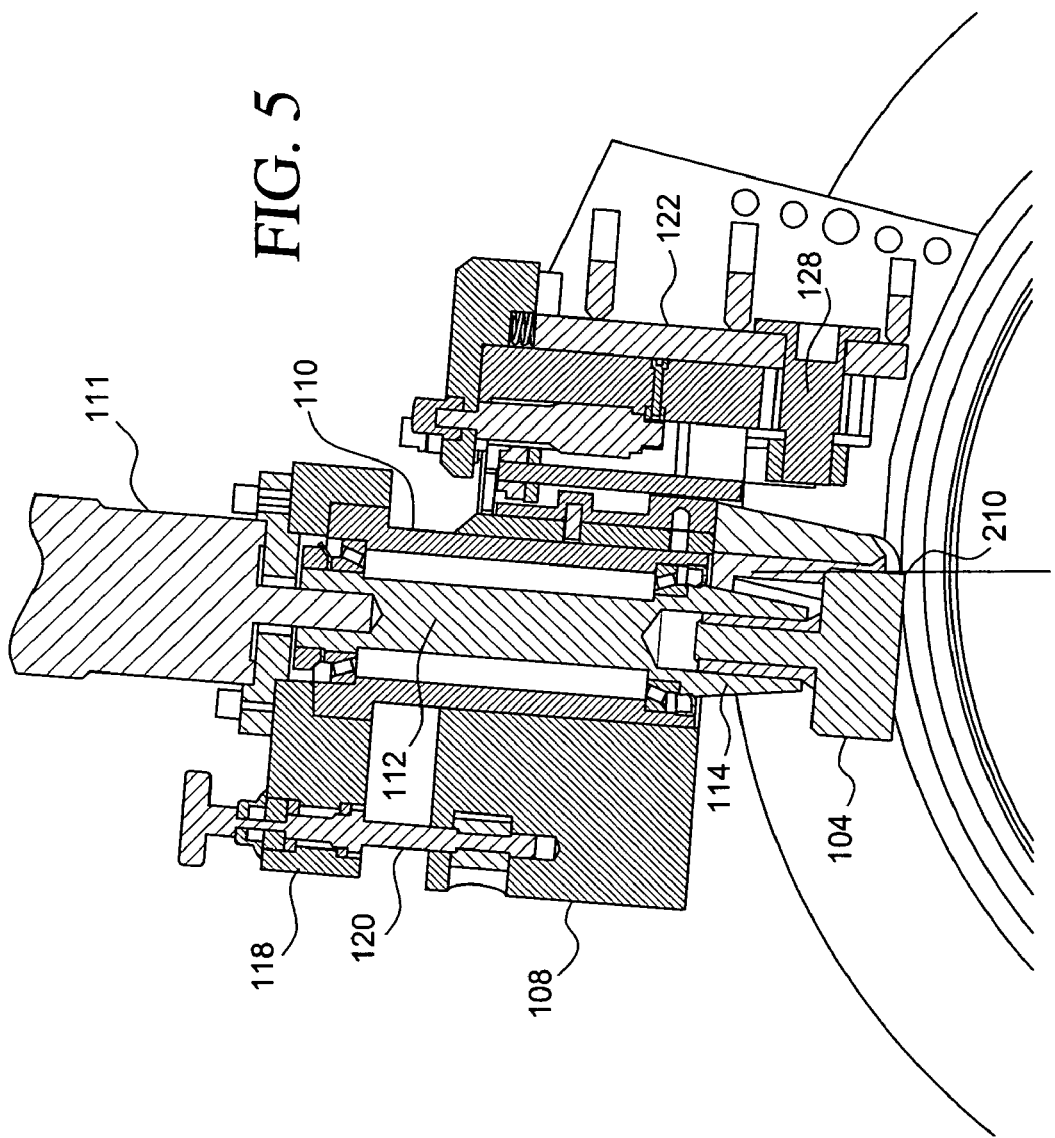
FIG. 5 is a sectional side view of the apparatus shown in FIG. 4.
Figure 6:
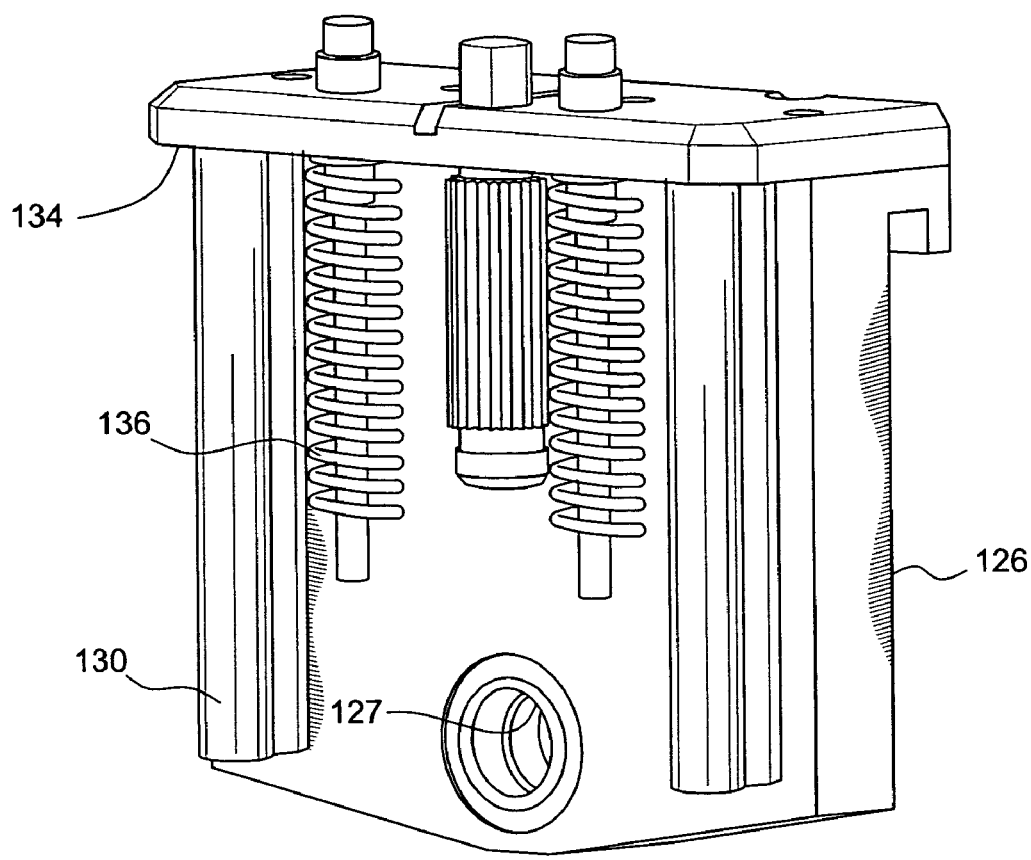
FIG. 6 is a perspective view of a pivotable first plate member of a pivotable tracking module for an apparatus for weld profiling.
Figure 7:
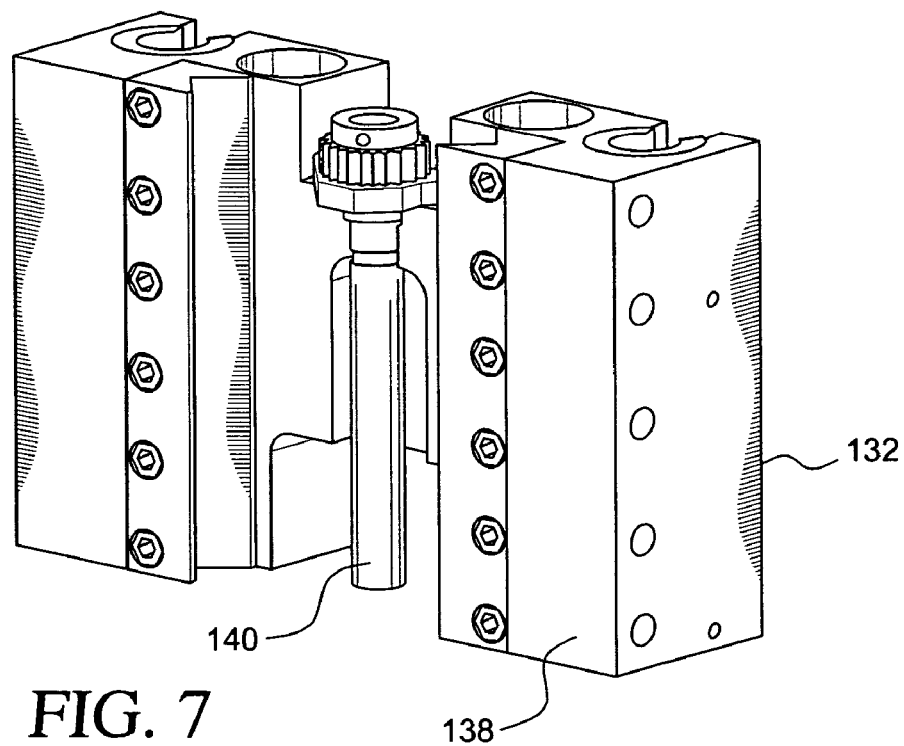
FIG. 7 is a perspective view of a sliding block member of the pivotable tracking module for an apparatus for weld profiling according to the present invention.
Figure 8:
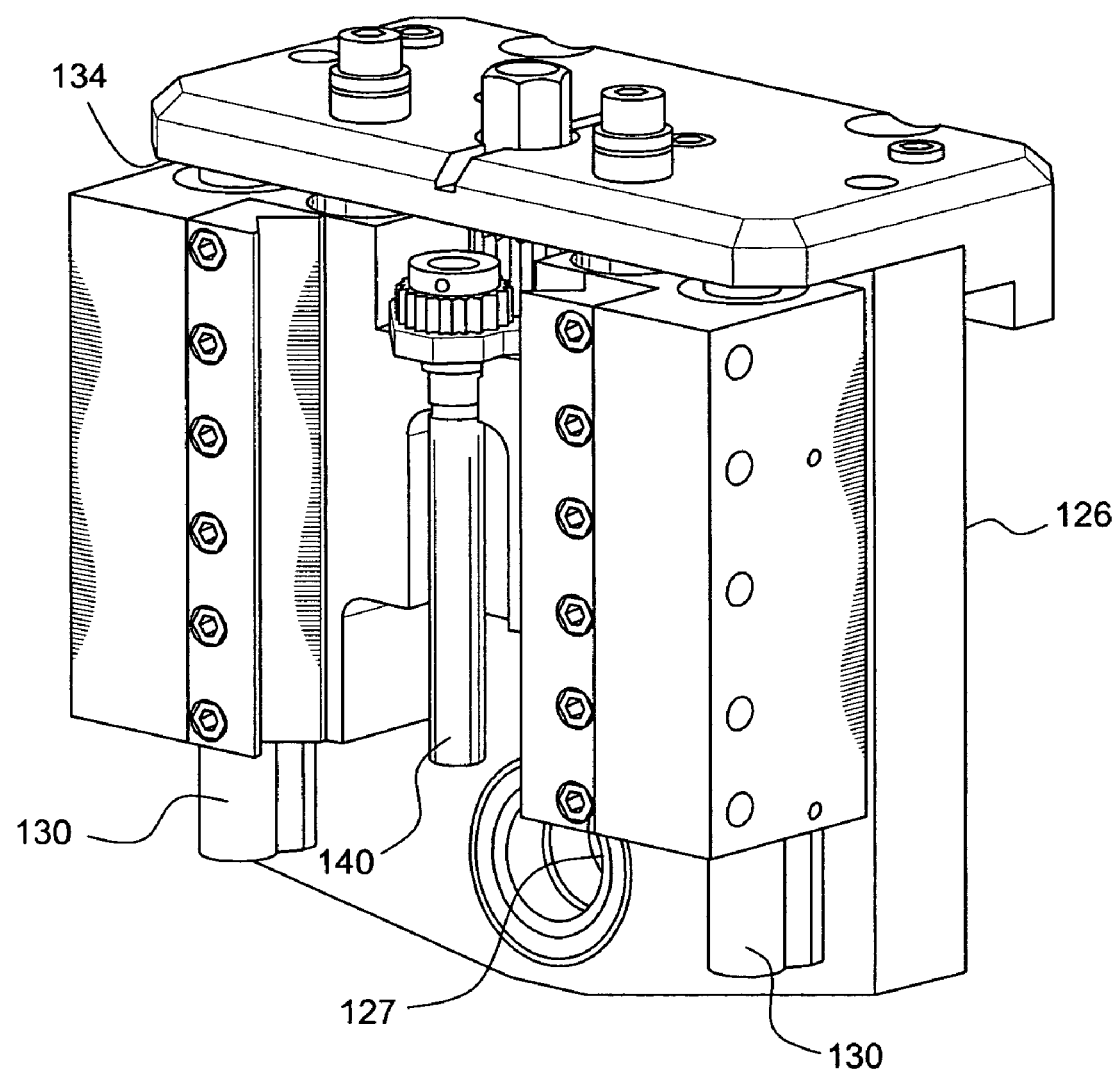
FIG. 8 is a perspective view of a pivotable tracking module for an apparatus for weld profiling according to the present invention, showing the sliding block member of FIG. 7 mounted onto the pivotable first plate member of FIG. 6.
Figure 9:
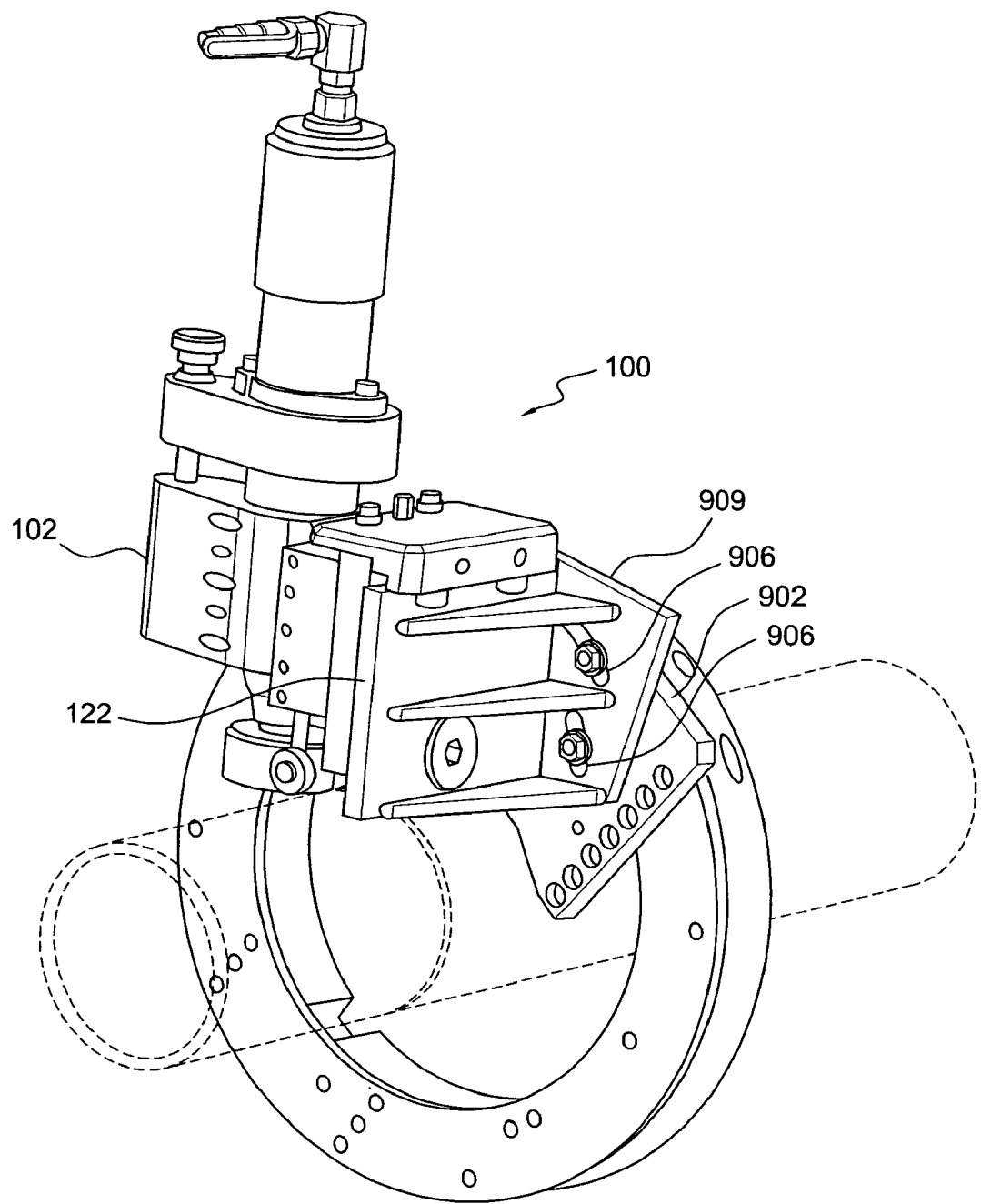
FIG. 9 is a perspective view of an apparatus for weld profiling including an adjustable mounting assembly whereby a milling tool offset angle $\theta_o$ is adjustable.

Referring now to FIGS. 1, 4, and 5, an exemplary apparatus for weld profiling according to the above-described method is described in greater detail. The apparatus shown is configured for performing a weld profiling operation for a welded joint between pipe sections. It can be recognized that the apparatus may be alternatively configured for profiling of welded joints between flat or irregular work pieces as well.

A track mechanism is used to carry a milling tool assembly 100 along a weld joint 5 between two adjoining work pieces 3. In the illustrated embodiment, the work pieces 3 are pipe segments and the track mechanism is a rotational drive mechanism 1 positioned about the perimeter of one work piece 3, adjacent to a weld joint 5 between two adjoining work pieces 3.

The rotational drive mechanism 1 provides a fixed track portion, and a movable portion movable along the fixed track. The milling tool assembly 100 is carried by the movable portion of the rotational drive mechanism 1 in a direction of travel circumferentially about the rotational drive mechanism 1, and thus circumferentially about a work piece 3 onto which the rotational drive mechanism 1 is mounted. The milling tool assembly 100 includes a milling tool 102 which is angled, or tilted, slightly (by offset angle $\theta_o$) in the tool feed direction and in a plane defined by the direction of travel and a rotational axis 200 of the milling head 104, whereby the milling head 104 defines a cutting arc 206 as described above.

The offset angle $\theta_o$ may be fixed at a predetermined angle, or may be made to be adjustable, either by the provision of an adjustment screw and hinged or movable mounting or a similar arrangement, whereby the offset angle $\theta_o$ may be adjusted continuously or in situ in real time, or by the provision of replaceable shims or the like whereby the offset angle $\theta_o$ may be adjusted by minimal disassembly and reassembly of the milling tool 102 or the milling tool assembly 100.

A tracking mechanism is provided whereby the milling tool 102 is pivotable from side to side, transversely to the direction of travel, so that the milling tool 102 may track and compensate for misalignments between adjacent outer wall areas on the work pieces 3 on either side of a weld joint 5.

In the illustrated embodiment, one variation of the tracking mechanism includes a pair of tracking wheels 106 that are coupled to the milling tool 102 proximate to the milling head 104. In operation, the tracking wheels 106 are brought into contact with work pieces on opposite sides of the weld joint 5. As the tracking wheels 106 advance along the work pieces 3, the tracking wheels 106 follow the surfaces of adjacent work pieces 3 to maintain a depth of cut of the milling head 104 relative to the surface, and also cause the milling tool 102 to pivot according to any misalignment between the work pieces 3 so that the milling head 104 is angled from side to side, transversely to the direction of travel, whereby the cutting arc 206 is continuously adjusted to maintain its intersection with the weld toes 9 along the weld joint 5.

The tracking mechanism also includes a spring loaded tracking module 124 on which the milling tool 102 is mounted. The milling tool 102 itself comprises a headstock 108 through which a spindle assembly 110 is slidably received. The spindle is rotatable within the spindle assembly 110. The milling head 104 is releasably held by a tool holder or chuck 114 coupled to the spindle 112 at a bottom end of the headstock 108. The tracking wheels 106 are mounted on a tracking wheel holder 116 that extends from a bottom end of the headstock 108, such that the tracking wheels 106 are positioned adjacent to the milling head 104.

The spring loaded tracking module 124 allows the milling tool 102 to pivot from side to side so that the cutting arc 206 of the milling head 104 is movable to compensate for any misalignment between work pieces 3, or for any eccentricity or out-of-roundness or other irregularity of either or both work pieces 3.

Referring now to FIGS. 5-8, an illustrated embodiment of a spring loaded tracking module 124 comprises a first plate member 126 pivotably attached to a mounting plate 122 extending from the rotational drive mechanism 1, the first plate member 126 pivoting about an axle 128. A suitable bearing arrangement may be provided in conjunction with a through-hole 127 in the first plate member 126 to accommodate the axle 128.

The first plate member 126 is pivotable about an axis generally oriented in the direction of travel such that the milling head 104 is moved from side to side slightly, transverse to the direction of travel, as the first plate member 126 pivots. Tracking rails or posts 130 are provided in front of the first plate member 126, for the slidable mounting of a spring biased sliding block 132. In the illustrated embodiment, the tracking posts 130 depend from an overhanging head piece 134 at the top of the first plate member 126, although alternative arrangements may be employed. The sliding block 132 is slidably disposed on the tracking posts 130. Biasing springs 136 are disposed between the first plate member 126 and the sliding block 132 such that the sliding block 132 is biased downward by the springs 136.

The milling tool 102 is mounted onto the sliding block 132 so that the milling tool 102 is biased, along with the sliding block 132, by the springs 136, toward work pieces 3. In the illustrated embodiment, the milling tool 102 is slidably engaged in a track 127 defined on a front face 138 of the sliding block 132. A threaded screw member 140 couples the milling tool 102 and the sliding block 132 so that the milling tool 102 may be adjusted in position along the sliding block 132. The threaded screw member 140 allows positioning of the milling tool 102, including the tracking wheels 106, toward or away from work pieces 3. As the milling tool 102 is positioned toward the work pieces, once the tracking wheels 106 contact the work pieces, the springs 136 are increasingly loaded to provide an increased bias on the milling tool against the work pieces. Thus, the milling head 104 is biased against the work pieces 3 and the milling tool 102 is allowed to pivot from side to side as the tracking wheels 106 move along the work piece surfaces.

An adjustment mechanism is provided so that the cutting depth of the milling tool may be adjusted. In the illustrated configuration, one variation of the adjustment mechanism includes a spindle assembly holder 118 that is attached to the spindle assembly 110 above the headstock 108, and the spindle assembly holder 118 is coupled to the headstock 108 by threaded feed screw 120 such that the spindle assembly 110 may be variably extended from the bottom end of the headstock 108 by turning the threaded feed screw 120. Adjustment of the threaded feed screw 120 extends or retracts the spindle assembly 110 from the headstock 108, and extends or retracts the spindle assembly 110 relative to the tracking wheels 106. Thus, the cutting depth of the milling tool 102 may be adjusted with the threaded feed screw 120 relative to the surfaces of the workpieces 3 as sensed by the tracking wheels 106.

A driving means 111, such as an air motor, electric motor, or another apparatus for rotationally driving the spindle 112, is mounted to the spindle assembly holder 118 and is drivingly connected to the spindle 112.

Referring to FIGS. 9-12, an adjustable mounting assembly is illustrated allowing adjustment of the offset angle $\theta_o$ of the milling tool 102. The adjustable mounting assembly comprises a fixed plate 902 which is fixed to the rotational drive mechanism 1. A back plate 904 is fastened to the fixed plate 902 by fasteners which pass through arcuate slots 906. A pair of concentric arcuate slots 906 are provided in the illustrated embodiment, such that the arcuate slots 906 each have a different radius 908a, 908b but have a common center 908c.

Mounting plate 122 extends from the back plate 904 to support the milling tool 102, as described above.

Thus, the offset angle $\theta_o$ of the milling tool 102 is adjusted by loosening the fasteners to rotate the milling tool 102 about the common center 908c, guided by the arcuate slots 906. When the desired offset angle $\theta_o$ is set, the fasteners are tightened for operation of the milling tool 102.

The arcuate slots 906 are preferably defined such that the common center 908c is located at, or near, the cutting edge of the milling head 104. It can be seen by reference to FIGS. 10-12 that the adjustable mounting assembly allows the milling tool assembly 100 to be positioned at an optimal offset angle $\theta_o$ on variously sized drive mechanisms 1 for use on pipe of different diameters.

It will be understood that the above-described exemplary embodiments of the invention are illustrative in nature, and that modifications thereof may occur to those skilled in the art. Accordingly, this invention is not to be regarded as limited to the exemplary embodiments disclosed herein, but is to be limited only as defined in the appended claims.

We claim:

1. A method for removing a weld crown from a welded joint defined by solidified weld metal spanning a first work piece and a second work piece, the method comprising the steps of:

positioning a milling tool proximate to the joint for movement in a direction of travel along the joint, the milling tool having a milling head rotatable about a rotational axis, the rotational axis extending generally normal to a surface of the first and second work pieces that is most proximate to the milling tool;

orienting said rotational axis in a first plane including said rotational axis and extending along said direction of travel to set a cutting arc of said milling head relative to the joint;

moving said milling tool in said direction of travel to cut a weld profile along the joint according to said cutting arc, wherein said cutting arc intersects the full span of weld metal and the first and second work pieces to a desired depth, thereby removing material from the weld metal and the first and second work pieces.

2. The method according to claim 1, further comprising the step of making adjustments to said rotational axis according to variations in alignment between the first and second work pieces such that said cutting arc is maintained in an intersecting relationship with said first and second work pieces.

3. The method according to claim 2, wherein said adjustments to said rotational axis occur in a second plane intersecting said rotational axis and a line generally perpendicular to said welded joint.

4. The method according to claim 3, wherein said rotational axis is tilted in said second plane.

5. The method according to claim 2, wherein said adjustments are continuously made as said milling tool is moved along said direction of travel.

6. The method according to claim 1, further comprising the step of positioning said milling tool to set a cutting depth of said milling head relative to said proximal surface before moving the milling tool in said direction of travel.

* * * * *